Patented Jan. 19, 1937

2,067,960

UNITED STATES PATENT OFFICE

2,067,960

ETHERS OF DIHYDRIC PHENOLS

James H. Werntz, Marshallton, Del., assignor to E. I. du Pont de Nemours & Company, Wilmington, Del., a corporation of Delaware No Drawing. Application December 27, 1934, Serial No. 759,339

10 Claims. (Cl. 260—150)

This invention relates to new compositions of matter comprising alkyl ethers of phenols, and more particularly to long chain alkyl ethers of hydroquinone.

This invention has as an object the manufacture of high molecular weight ethers of hydroquinone. A further object is the preparation of dodecyl, tetradecyl, etc., ethers of hydroquinone readily soluble in hydrocarbon solvents, lubricating oils, and edible oils and fats.

These objects are accomplished by the following invention wherein the hydrogen of at least one hydroxyl group of hydroquinone is replaced by the radical of a 12 to 14 carbon atom saturated primary aliphatic alcohol.

This invention is practiced in its preferred form as follows: Hydroquinone and an alkyl halide such as dodecyl bromide are dissolved in absolute ethyl alcohol and heated to boiling under a reflux condenser. Potassium hydroxide dissolved in absolute alcohol is then added slowly from a dropping funnel and the precipitate which forms is filtered off. The alcohol solution is diluted with water, extracted with a solvent such as benzene, and the extract washed with hot water to remove the unreacted hydroquinone. The solvent, benzene, is then evaporated and the mixture of the mono- and didodecyl ethers of hydroquinone is separated by fractional crystallization from absolute ethyl alcohol. The monododecyl ether of hydroquinone is readily soluble in ethyl alcohol, whereas the didodecyl ether is quite insoluble. The monoether however, may be separated from the didodecyl ether by extracting either the ether or benzene solution with a 10% aqueous potassium hydroxide solution, altho repeated extractions are necessary for the complete separation of the two ethers. Thus, a mixture of 25 parts by weight of the didodecyl ether of hydroquinone and 22 parts by weight of the monododecyl ether of hydroquinone dissolved in ether and extracted several times with 10% aqueous potassium hydroxide solution gave a yield of only 4 grams of the monododecyl ether of hydroquinone in the extract. However, when the mixture was suspended in absolute ethyl alcohol, the monododecyl ether of hydroquinone dissolved and the alcohol solution was readily separated from the substantially insoluble didodecyl ether of hydroquinone by one treatment. The monododecyl ether of hydroquinone while much more soluble in aqueous potassium hydroxide solution than the didodecyl ether, is not nearly so soluble as the monobutyl ether of hydroquinone.

Having outlined above the principles and purposes of the invention, the following examples thereof are appended for purposes of illustration and not in limitation:

*Example 1.—Dodecyl ethers of hydroquinone*

Seventy-five parts by weight of dodecyl bromide, and 36.3 parts by weight of hydroquinone were dissolved in 39 parts by weight of absolute ethyl alcohol and heated at 80° C. under a reflux condenser. Eighteen and five-tenths parts by weight of potassium hydroxide dissolved in 78 parts by weight of absolute ethyl alcohol were added slowly from a dropping funnel to the refluxing solution. The heating was continued for 5 hours. On cooling, the reaction mixture was diluted with ether and washed first with water and then several times with 10% aqueous potassium hydroxide solution. The ether was then distilled from the mixture of the mono- and didodecyl ethers of hydroquinone and 48 parts by weight of product was isolated. One recrystallization from absolute alcohol yielded 25 parts by weight of didodecyl ether of hydroquinone, and 18 parts by weight of the monododecyl ether of hydroquinone. On recrystallization of the didodecyl ether of hydroquinone from absolute alcohol, needle-like crystals were obtained melting at 72° C. The monododecyl ether of hydroquinone was recrystallized from petroleum ether and melted at 78° C.

*Example 2.—Dodecyl ethers of hydroquinone*

Sixty-one and three-tenths parts by weight of dodecyl chloride and 36.3 parts by weight of hydroquinone were dissolved in 39 parts by weight of ethyl alcohol and heated to boiling (75°–80° C.) under a reflux condenser. Eighteen and five-tenths parts by weight of potassium hydroxide dissolved in 56 parts by weight of alcohol were added slowly to the refluxing solution. The heating was continued six hours. The product was diluted with water and extracted with ether. The ether extract was repeatedly extracted with 10% potassium hydroxide solution and 48 parts by weight of alkali insoluble material and 15 parts by weight of alkali soluble material were isolated. Fractional crystallization of the alkali insoluble portion yielded 13.5 parts by weight of the didodecyl ether of hydroquinone, 3 parts by weight of the monododecyl ether of hydroquinone, and 28.5 parts by weight of dodecyl chloride. The alkali soluble material was fractionally separated by means of petroleum ether and yielded 12 parts by weight of the monododecyl ether of hydroquinone. The monododecyl ether of hydroquinone when recrystallized from petroleum ether melted at 78° C. and analyzed for the theoretical carbon and hydrogen content. The didodecyl ether of hydroquinone, recrystallized from absolute alcohol, melted at 72° C. and analyzed for the theoretical carbon and hydrogen content.

*Example 3.—Dodecyl ethers of catechol*

Seventy-five parts by weight of dodecyl bromide, 36.3 parts of catechol were dissolved in 39 parts by weight of absolute alcohol and heated to boiling under a reflux condenser. Eighteen and five-tenths parts by weight of potassium hydroxide dissolved in 78 parts by weight of absolute alcohol were added slowly from a dropping funnel. Refluxing was continued 3.5 hours. On cooling, the solution was filtered to remove the potassium bromide which separated. The solution was concentrated by evaporating the alcohol which upon chilling yielded 10 parts by weight of the didodecyl ether of catechol, white needles melting at 46-7° C. The alcoholic filtrate was diluted with water, acidified, and extracted with ether. The ether extract was washed with water until neutral, dried over sodium sulfate and the ether evaporated. Forty-nine parts by weight of product was obtained which on distillation yielded 29 parts by weight of a liquid boiling at 180°-182° C. at 3 mm. Carbon and hydrogen analysis indicated the product to be the monododecyl ether of catechol.

*Example 4.—Dodecyl ethers of resorcinol*

Sixty-one and three-tenths parts by weight of dodecyl chloride, 36.3 parts by weight of resorcinol are dissolved in 39 parts by weight of ethyl alcohol and are heated at 75-80° C. under a reflux condenser. Eighteen and five-tenths parts by weight of potassium hydroxide dissolved in 56 parts by weight of alcohol are added slowly to the refluxing solution. The heating is continued 6 hours. On cooling, the solution is filtered to remove the potassium chloride which separates. The solution is concentrated by evaporating a portion of the alcohol and upon chilling yields the didodecyl ether of resorcinol, white needles melting 59° C. The alcoholic filtrate is diluted with water, acidified and extracted with ether. The ether extract is washed with water, dried over sodium sulfate and the ether evaporated. On distillation the monododecyl ether of resorcinol, boiling at 180-200° C. at 3 mm. is obtained as a low melting solid.

By the same method other long chain alkyl ethers may be prepared. Thus, the didecyl ether of hydroquinone, melting point 68° C.; the ditetradecyl ether of hydroquinone, melting point 75.8° C.; the dioctadecyl ether of hydroquinone, melting point 88° C.; the dipentadecyl ether of hydroquinone, melting point 84° C.; the diheptadecyl ether of hydroquinone, melting point 90° C.; the didecyl ether of resorcinol, melting point 51.6° C.; the didodecyl ether or resorcinol, melting point 59.4° C.; the ditetradecyl ether of resorcinol, melting point 59.2° C.; and the dipentadecyl ether of resorcinol, melting point 64° C.

*Example 5.—Mixed alkyl ethers of hydroquinone*

A mixture of the alcohols obtained by the carboxylic hydrogenation of coconut oil was treated with hydrogen chloride and converted to the chlorides. The low-boiling material, including the octyl chloride, was removed by distillation. The resulting mixture of chlorides contained decyl, dodecyl, tetradecyl, cetyl, octadecyl, and eicosyl chlorides. Sixty-five and five-tenths parts by weight of these mixed chlorides, and 36.3 parts by weight of hydroquinone were heated to a reflux temperature in about 40 parts by weight of absolute alcohol. Eighteen and five-tenths parts by weight of potassium hydroxide dissolved in about 60 parts by weight of absolute alcohol were added slowly to the refluxing solution and the refluxing continued for a total of 9 hours. Insoluble potassium chloride precipitated from the reaction mixture during the refluxing. The product was diluted with hot water and the aqueous layer extracted with benzene. The oil layer diluted with benzene was washed once with water and then with water containing hydrogen chloride, and finally with warm water until neutral. Upon evaporation of the benzene, a chocolate colored, waxy solid remained, which was a mixture of the mono- and dialkyl ethers of hydroquinone.

In place of dodecyl halides in the examples, the halides of tetradecyl alcohol or tridecanol may also be employed. For certain purposes, substituted dihydric phenols, e. g., nitrohydroquinone may be used, altho the preferred method of preparing the nitro-substituted ethers is the nitration of the previously prepared ether of the dihydric phenol. Mixed ethers may be made by reacting hydroquinone with a mixture of two halides such as dodecyl chloride and butyl chloride or the monobutyl ether of hydroquinone may be made and then reacted with dodecyl bromide to form butyl dodecyl diether of hydroquinone.

A particularly preferred embodiment of the invention is that disclosed in Example 5, wherein the hydroquinone ether of the mixture of alcohols obtainable by the carboxylic reduction of the essentially saturated fatty oils of the type of coconut oil and palm kernel oil is prepared. Because of the availability of this alcohol mixture and the advantageous results obtained from the use thereof, this represents an especially desirable form of the invention.

The examples disclose the use of ethyl alcohol as a solvent for the reaction. A higher boiling alcohol such as butyl alcohol may be used to advantage since the reaction is then carried out at a higher temperature and is completed in a shorter time. Ethyl alcohol may be used at a higher temperature, e. g., 150° C., by reacting the components in an autoclave under pressure. A catalyst such as dibutylamine or iodine may be used to advantage. While reaction of an alkyl halide with hydroquinone in the presence of alkali is the preferred procedure, other methods may be employed. Thus, 288 parts by weight of sodium dodecylsulfate and 132 parts by weight of the mono-sodium salt of hydroquinone may be heated for several hours at 160° C. in 750 parts by weight of hydroquinone. The reaction product is poured into water, the insoluble layer separated and repeatedly washed with hot water. Upon distillation of the reaction product, the monododecyl ether and the didodecyl ether of hydroquinone are separated. Sodium dodecylphosphate may be used in place of the sodium dodecylsulfate. Long chain ethers of hydroquinone may also be prepared by reacting phenol with concentrated sulfuric acid to obtain a mixture of the o- and p-sulfonic acids of phenol. These acids are then heated at 90° C. for one hour with sodium hydroxide and the mixture of the alcohols obtained in the hydrogenation of coconut oil acids. The hot reaction mixture is then stirred into a mixture of 4 parts of methyl alcohol and one part of water. After cooling to 20° C., the product which separates is filtered off and is a mixture of the various mono- and dialkyl ethers of catechol and hydroquinone. A further process of manufacture comprises dissolving hydroquinone in xylene, heating to reflux temperature, and slowly adding an alkyl halide such as tetradecyl chloride. In a still further modification of the invention, hydroquinone may be reacted with a slight excess of the molar quantity of dodecyl bromide and slightly less than one molar quantity of potassium carbonate in boiling acetone in the presence of a small amount of iodine. These processes are generally applicable to the formation of hydroquinone ethers of 12 to 14 carbon atom saturated aliphatic, preferably straight chain, alcohols.

The ethers of polyhydric phenols such as dodecyl ethers of hydroquinone may be used as a constituent of lubricating oils. Ethers which contain at least one free phenolic group are of use as antioxidants for gasoline in the prevention of the formation of gum. The introduction of a dodecyl or tetradecyl group into the dihydric phenols renders them more soluble and less toxic than the dihydric phenol itself, and the ethers may be used to advantage as antioxidants to retard the formation of rancidity in edible and other vegetable or animal oils. Thus, the monoethers of hydroquinone may be employed to retard the formation of rancidity in castor oil coating compositions and to reduce the tendency of mustard to become rancid. In place of the monoethers of hydroquinone the monoethers of catechol may be used to retard the formation of rancidity in castor oil coating compositions. Either the monoethers of hydroquinone or the monoethers of catechol are preferred to the monoethers of resorcinol for use as antioxidants since the monoethers of resorcinol are inferior in their antioxidant effectiveness, for example, in lard. These long chain ethers of hydroquinone may be employed as intermediates or modifying agents for condensation with formaldehyde in the formation of resins. The diethers may be used as plasticizers with ethyl cellulose and nitrocellulose and as compounding agents with rubber.

The long chain monoalkyl ethers of dihydric phenols are increasingly less soluble in water with increase in molecular weight but increasingly more soluble in hydrocarbon solvents and hydrocarbon, vegetable, and animal oils. The monododecyl ether of hydroquinone is less soluble in 10% potassium hydroxide solution than the monooctyl ether of hydroquinone but the monododecyl ether is more readily dissolved by lard or butter substitutes than the monooctyl ether. The monododecyl ether is less soluble in aqueous caustic solution than the monodecyl ether, and the monooctadecyl ether is still less soluble. The monododecyl ether of hydroquinone is more soluble than the monodecyl ether of hydroquinone in hydrogenated cottonseed oil. It is obvious that these substantial insolubilities in water or alkali solutions are important considerations for certain applications. It is likewise obvious that the ready miscibility in gasoline, lubricating oils, lard, butter substitutes, and the like, is of considerable advantage. It is further to be noted that these long chain ethers of hydroquinone are definitely less toxic than the shorter chain ethers of the same phenol. In moistureproofing compositions where the dialkyl ethers are used as the waxy component, their high boiling points are of decided advantage. The didodecyl ether of hydroquinone is definitely more advantageous than is the dioctyl.

The above description and examples are intended to be illustrative only. Any modification of or variation therefrom which conforms to the spirit of the invention is intended to be included within the scope of the claims.

I claim:
1. Process of preparing ethers of monocyclic dihydric phenols, which comprises reacting a salt of a monocyclic dihydric phenol with a saturated primary alkyl halide of at least 10 carbon atoms and separating the mono- and dialkyl ethers by extraction with an alcohol.

2. Process of preparing ethers of hydroquinone which comprises reacting a salt of hydroquinone with a saturated primary alkyl halide of at least 10 carbon atoms and separating the mono and dialkyl ethers by extraction with an alcohol.

3. Process of preparing dodecyl ethers of hydroquinone which comprises reacting hydroquinone with dodecyl halide and a base and separating the mono and dialkyl ethers by extraction with an alcohol.

4. Process of preparing the dodecyl ethers of hydroquinone, which comprises reacting hydroquinone with dodecyl bromide and potassium hydroxide in the presence of absolute alcohol during five hours at reflux temperature, and separating the mono- and didodecyl ethers by extraction with ethyl alcohol.

5. Process of preparing the dodecyl ethers of hydroquinone, which comprises reacting hydroquinone with a dodecyl halide and a base in the presence of an inert solvent and separating the mono and dialkyl ethers by extraction with an alcohol.

6. A hydroquinone ether wherein the hydrogen of both hydroxyl groups is replaced by the radical of a 12 to 14 carbon atom saturated primary aliphatic alcohol.

7. A hydroquinone ether composition wherein the hydrogen of at least one hydroxyl group is replaced by the radicals of the mixture of alcohols obtainable by the carboxylic reduction of an essentially saturated fatty oil, said mixture of alcohols being composed principally of dodecyl alcohol.

8. A hydroquinone ether composition wherein the hydrogen of both hydroxyl groups is replaced by the radicals of the mixture of alcohols obtainable by the carboxylic reduction of an essentially saturated fatty oil, said mixture of alcohols being composed principally of dodecyl alcohol.

9. Ditetradecyl ether of hydroquinone.
10. Didodecyl ether of hydroquinone.

JAMES H. WERNTZ.